UNITED STATES PATENT OFFICE.

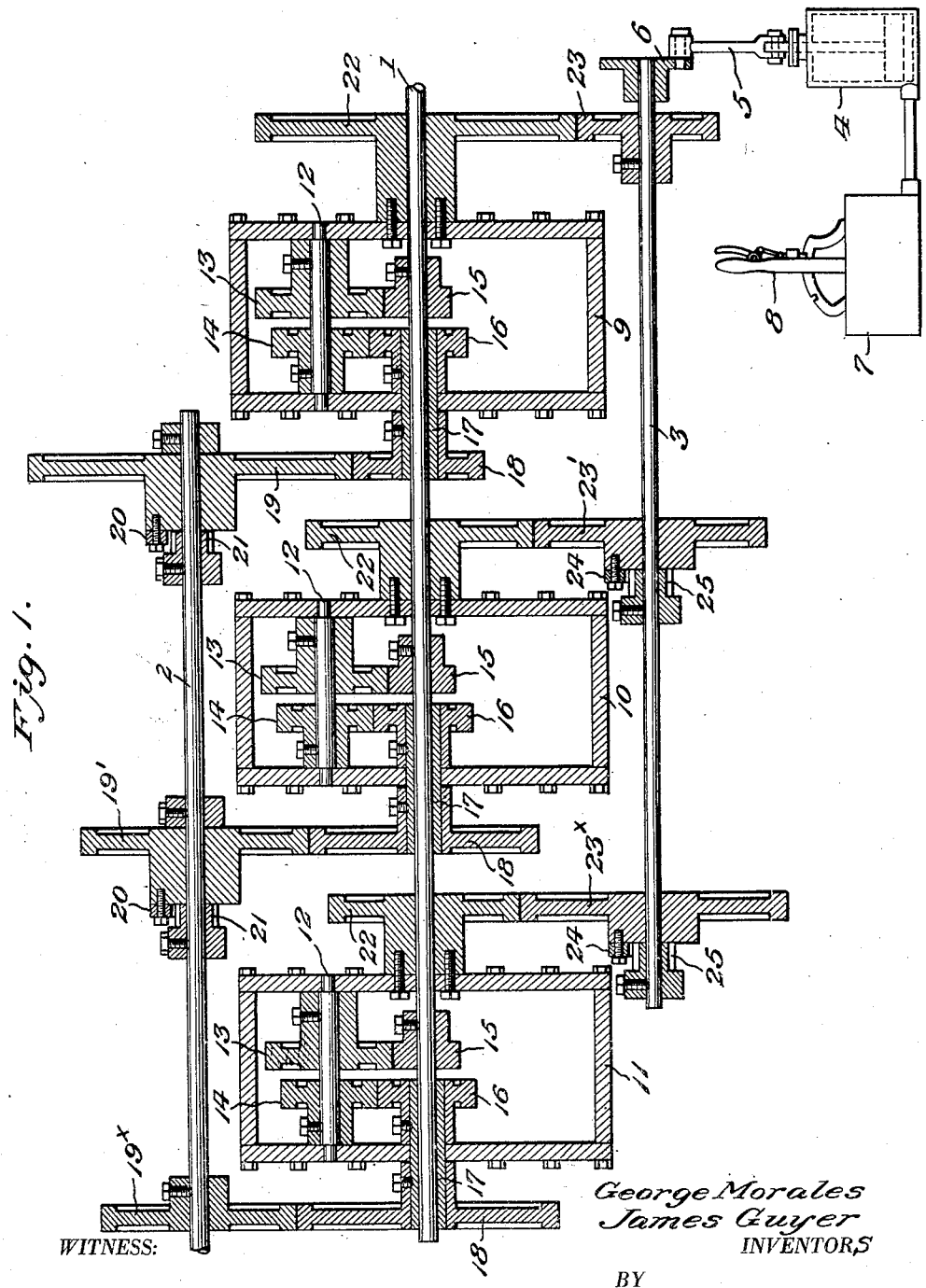

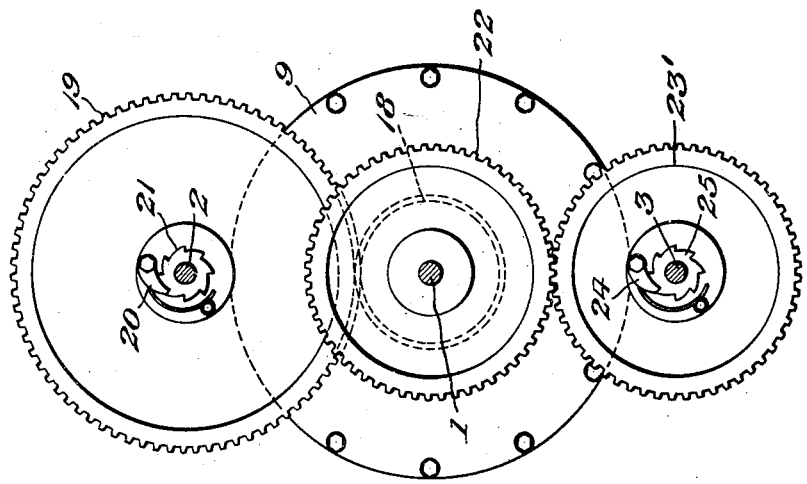

JAMES GUYER AND GEORGE MORALES, OF NEW YORK, N. Y.

TRANSMISSION-GEARING.

1,337,906.

Specification of Letters Patent.  Patented Apr. 20, 1920.

Application filed July 12, 1919. Serial No. 311,333.

*To all whom it may concern:*

Be it known that we, JAMES GUYER and GEORGE MORALES, citizens of the United States and France, respectively, residing at New York, in the county of New York and State of New York, have invented new and useful Improvements in Transmission-Gearing, of which the following is a specification.

This invention relates to improvements in transmission-gear apparatus more particularly adapted for automobiles.

The principal object of the invention is to provide means for automatically changing the speed, from low speed to intermediate and from intermediate to high, without the use of clutch means.

Another object of the invention is to provide fluid pressure means for controlling actuation of the transmission elements so that the shifting from one speed to the next may be regulated, as desired.

The invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a longitudinal sectional view of the invention;

Fig. 2 is a cross section thereof.

In these views 1 indicates the power shaft and 2 the load or driven shaft. 3 indicates the third shaft which is connected with a fluid pump 4 by the rod 5 and crank 6. The pump or compressor is connected with a receiver 7, the outlet of which is controlled by a suitable valve, the handle of which is shown at 8. The power shaft 1 has rotatably mounted thereon the three houses 9, 10 and 11. Each housing has journaled therein a jack shaft 12 on which are secured the two gears 13 and 14. As shown, these gears vary in size in the several houses. The gear 13 in each housing meshes with the gear 15 secured to the power shaft while the gear 14 meshes with the gear 16 which is carried by a hollow shaft 17 rotatably mounted on the power shaft and extending through one side of the housing. The other end of this hollow shaft carries a gear 18 which meshes with a gear 19 rotatably mounted on the driven shaft 2. As shown, the gears 19 and 19' which are respectively connected with the gears of the housings 9 and 10 are provided with the pawls 20 which engage with the annular ratchets 21 connected with the load shaft 2. The gear 19ˣ which is connected with the gears of the housing 11, is secured to said load shaft. Each housing has secured thereto a gear 22, the hub of which surrounds the drive shaft 1 and each of these gears meshes with a gear 23 carried by the compressor shaft 3. The gears 23' and 23ˣ which mesh with the gears connected with the housings 10 and 11 are connected with the compressor shaft by means of the pawls 24 and the ratchets 25 while the gear 23 which meshes with the gear of the housing 9, is secured to said compressor shaft.

Assuming that the load is on the shaft 2 and the control valve is open, when the power shaft begins to rotate the housings will be rotated by means of the gears 15 meshing with the gears 13, thus causing the jack shafts to rotate so that the gears 14 will run around the gears 16, the said gears 16 being held stationary by the resistance of the load on the shaft 2. As the housings rotate the compressor shaft 3 will be rotated, but as the receiver is opened the compressor will offer no resistance to the movement of the parts. When the valve is moved into running position the compressor will offer resistance to the rotation of the housings and when this resistance becomes greater than the load the gears 14 will begin to rotate the gears 16 and thus the hollow shafts will be rotated and this movement will be transmitted to the load shaft by means of the gears 18 and 19 and the pawl and ratchets 20 and 21. While this movement is taking place the gears 23' and 23ˣ will act as idlers as the pawls 24 will simply ride freely over the ratchets 25 due to the greater speed of the shaft 3 in respect the said gears 23' and 23ˣ. As the resistance of the compressor increases and the speed of the shaft decreases, the gear 23' will begin to drive said shaft 3 by means of its pawl and ratchet and when the resistance offered the housing 10 by the compressor becomes greater than that offered by the load, the gears in the housing 10 will pick up the load by means of the gear 19' and its pawl and ratchet and as these gears drive the load shaft at greater speed than that in which the gear 19 is being driven by its gears, this gear 19 will idle on the load shaft as the pawl 20 will simply ride over the ratchet 21. In due course of time the resistance of the compressor causes the gears in the housing 11 to pick up the load and then the gear 19' as well as the gear 19 idle as does also the gear 23'.

It will thus be seen that the speed is automatically changed from low speed to high speed and this changing of the speeds is controlled by the position of the valve in the receiver.

By this arrangement of parts a flexible transmission of power from the drive shaft to the load shaft is secured without the use of clutch means and there is no danger of stripping the gears or of twisting the shafts.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. In an apparatus of the class described, a driving shaft, a driven shaft, gears on said shafts, a number of housings rotatably mounted on the driving shaft, a jack shaft carried by each housing, gears on said jack shafts, one gear on each jack shaft meshing with the gear on the driving shaft, a number of hollow shafts rotatably mounted on the driving shaft and having portions located within the housings, a gear on each hollow shaft meshing with the remaining gear on the jack shaft, a gear at the outer end of each hollow shaft meshing with the gear on the driven shaft, ratchet means connecting the gears on the driven shaft to said shaft and means for resisting the movement of the housings.

2. In an apparatus of the class described, a driving shaft, a driven shaft, gears on said driven shaft, ratchet means connecting some of said gears with said shaft, housings rotatably mounted on the driving shaft, gears on said driving shaft, one of which is located in each housing, a jack shaft mounted in each housing, gears on said jack shafts, one of which engages with the gears on the driving shaft, hollow shafts rotatably mounted on the driving shaft and each having one end extending into a housing, a gear on said end engaging with one of the gears on the jack shaft, a gear on the outer end of the hollow shaft engaging with the gear on the driven shaft, a compressor shaft, compressor means connected therewith and gears connecting said compressor shaft with the housings, and ratchet means connecting some of said gears with the compressor shaft.

3. In an apparatus of the class described, a driving shaft, a driven shaft, gears on said driven shaft, ratchet means connecting some of said gears with said shaft, housings rotatably mounted on the driving shaft, gears on said driving shaft, one of which is located in each housing, a jack shaft mounted in each housing, gears on said jack shaft, one of which engages with the gear on the driving shaft, hollow shafts rotatably mounted on the driving shaft and each having one end extending into a housing, a gear on said end engaging with one of the gears on the jack shaft, a gear on the outer end of the hollow shaft engaging with the gear on the driven shaft, a compressor shaft, compressor means connected therewith and gears connecting said compressor shaft with the housings, ratchet means connecting some of said gears with the compressor shaft and valve means for regulating the compressor means.

In testimony whereof we have affixed our signatures.

JAMES GUYER.
GEORGE MORALES.